US009292793B1

(12) United States Patent
Lin et al.

(10) Patent No.: US 9,292,793 B1
(45) Date of Patent: Mar. 22, 2016

(54) ANALYZING DEVICE SIMILARITY

(75) Inventors: Derek Lin, San Mateo, CA (US); Yael Villa, Tel Aviv (IL); Alon Kaufman, Bnei-Dror (IL)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 13/436,936

(22) Filed: Mar. 31, 2012

(51) Int. Cl.
*G06N 7/00* (2006.01)
*G06N 5/04* (2006.01)

(52) U.S. Cl.
CPC . *G06N 5/04* (2013.01); *G06N 7/005* (2013.01)

(58) Field of Classification Search
None
See application file for complete search history.

(56) References Cited

U.S. PATENT DOCUMENTS

| | | | | |
|---|---|---|---|---|
| 6,480,837 B1* | 11/2002 | Dutta | | G06F 17/30864 |
| 6,990,685 B1* | 1/2006 | Christensen | | G06F 9/4408 713/2 |
| 7,254,501 B1* | 8/2007 | Brown | | G01J 3/28 702/28 |
| 7,280,822 B2* | 10/2007 | Fraccaroli | | H04L 67/04 455/414.1 |
| 7,366,705 B2* | 4/2008 | Zeng | | G06F 17/3071 706/20 |
| 7,376,643 B2* | 5/2008 | Zeng | | G06F 17/30864 |
| 7,533,094 B2* | 5/2009 | Zhang | | G06F 17/3069 |
| 7,630,986 B1* | 12/2009 | Herz | | G06Q 10/10 |
| 7,634,741 B2* | 12/2009 | Klein | | G06F 17/30398 715/810 |
| 7,668,405 B2* | 2/2010 | Gallagher | | G06F 17/30244 382/305 |
| 7,711,747 B2* | 5/2010 | Renders | | G06F 17/3071 707/771 |
| 7,743,044 B1* | 6/2010 | Kalogeraki | | G06F 17/30106 707/706 |
| 7,853,437 B2* | 12/2010 | Seguin | | G01S 7/021 342/463 |
| 7,996,390 B2* | 8/2011 | Freire | | G06F 17/30705 707/722 |
| 8,005,767 B1* | 8/2011 | Cassella | | G06K 9/6221 706/12 |
| 8,024,343 B2* | 9/2011 | Gallagher | | G06F 17/30265 382/118 |
| 8,065,254 B1* | 11/2011 | Das | | G06F 17/30864 706/46 |
| 8,131,799 B2* | 3/2012 | Landsman | | H04L 63/0407 709/203 |
| 8,180,777 B2* | 5/2012 | Duchon | | G06Q 10/04 706/45 |
| 8,244,653 B2* | 8/2012 | Jager | | H04M 1/72569 706/20 |
| 8,738,563 B2* | 5/2014 | Shehory | | G06F 11/3664 702/186 |
| 2003/0185450 A1* | 10/2003 | Garakani | | G06K 9/0014 382/232 |
| 2005/0131492 A1* | 6/2005 | Kroll | | A61N 1/08 607/60 |
| 2005/0234880 A1* | 10/2005 | Zeng | | G06F 17/30616 |
| 2008/0037876 A1* | 2/2008 | Galperin | | G06F 17/30247 382/203 |
| 2008/0114750 A1* | 5/2008 | Saxena | | G06F 17/30687 |
| 2008/0137950 A1* | 6/2008 | Park | | G06K 9/00335 382/168 |

(Continued)

OTHER PUBLICATIONS

Rainer Bye et al., "CIMD—Collaborative Intrusion and Malware Detection," Technical Report: TUB-DAI Aug. 8, 2001, Tu Berlin, Aug. 11, 2008.*

(Continued)

*Primary Examiner* — Wilbert L Starks
*Assistant Examiner* — Fuming Wu
(74) *Attorney, Agent, or Firm* — John T. Hurley; Jason A. Reyes; Krishnendu Gupta

(57) ABSTRACT

A method is used in analyzing device similarity. Data describing a device is received and a model is applied to the data. Based on the modeling, a measure of similarity between the device and a previously known device is determined.

20 Claims, 3 Drawing Sheets

(56) References Cited

U.S. PATENT DOCUMENTS

| | | | |
|---|---|---|---|
| 2008/0208621 A1* | 8/2008 | Karkanias | G06Q 50/22 705/2 |
| 2008/0256230 A1* | 10/2008 | Handley | H04L 63/145 709/224 |
| 2009/0013006 A1* | 1/2009 | Friedl | G06F 17/3089 |
| 2009/0082637 A1* | 3/2009 | Galperin | G06F 19/321 600/300 |
| 2009/0210406 A1* | 8/2009 | Freire | G06F 17/30864 |
| 2010/0057843 A1* | 3/2010 | Landsman | H04L 63/0407 709/203 |
| 2010/0138452 A1* | 6/2010 | Henkin | G06Q 30/0256 707/803 |
| 2010/0211605 A1* | 8/2010 | Ray | G06F 17/30023 707/780 |
| 2010/0280920 A1* | 11/2010 | Scott | G01S 5/0027 |
| 2010/0332475 A1* | 12/2010 | Birdwell | G06F 17/30333 707/737 |
| 2011/0093449 A1* | 4/2011 | Belenzon | G06N 7/005 707/708 |
| 2011/0131172 A1* | 6/2011 | Herzog | G06Q 10/10 706/58 |
| 2011/0145226 A1* | 6/2011 | Gollapudi | G06F 17/30867 707/723 |
| 2011/0231415 A1* | 9/2011 | Kim | G06F 17/30864 707/752 |
| 2011/0238613 A1* | 9/2011 | Shehory | G06F 11/3664 706/52 |
| 2011/0243449 A1* | 10/2011 | Hannuksela | G06K 9/00221 382/190 |
| 2011/0268323 A1* | 11/2011 | Gallagher | G06F 17/30265 382/118 |
| 2011/0286628 A1* | 11/2011 | Goncalves | G06F 17/30256 382/103 |
| 2012/0303619 A1* | 11/2012 | Fisera | G06Q 50/06 707/737 |
| 2013/0103634 A1* | 4/2013 | Jojic | G06Q 30/02 706/52 |
| 2013/0139263 A1* | 5/2013 | Beyah | H04L 63/1408 726/23 |

OTHER PUBLICATIONS

Rene Mayrhofer et al, "Shake Well Before Use: Intuitive and Secure Pairing of Mobile Devices," IEEE Transactions on Mobile Computing, Vol. 8, No. 6, Jun. 2009.*

Pedersen, "Learning Probabilistic Models of Word Sense Disambiguation," PhD Thesis, Southern Methodist University, May 1998, 195 pp.*

* cited by examiner

| SOURCE | ELEMENTS |
|---|---|
| LOGIN HTTP SESSION INFO | COOKIE |
| | USER AGENT STRING |
| | IP GEO/IP |
| JAVASCRIPT QUERIED RESULTS | ACCEPT LANGUAGE |
| | USER LANGUAGE |
| | BROWSER LANGUAGE |
| | SYSTEM LANGUAGE |
| | TIME ZONE |
| | SOFTWARE PLUGIN STRING |
| | SCREEN DISPLAY SIZE |

FIG. 2

$$\begin{pmatrix} userAgent \\ acceptLang \\ SysLang \\ userLang \\ browserLang \\ timezone \\ software \\ screen \\ IPGeo \end{pmatrix} \begin{pmatrix} mismatch \\ mismatch \\ match \\ mismatch \\ null \\ match \\ match \\ match \\ match \end{pmatrix}$$

FIG. 3

| PAIR | USER | LANGUAGE | TIME ZONE |
|------|------|----------|-----------|
| SAME | MATCH | MATCH | MATCH |
| SAME | MATCH | MATCH | NO MATCH |
| SAME | MATCH | NO MATCH | NO MATCH |
| DIFF | NO MATCH | NO MATCH | NO MATCH |
| DIFF | NO MATCH | NO MATCH | MATCH |
| DIFF | MATCH | NO MATCH | NO MATCH |

FIG. 4

ANALYZING DEVICE SIMILARITY

RELATED APPLICATIONS

This application is related to U.S. patent application Ser. No. 13/332,889, entitled ANALYZING DEVICE SIMILARITY, filed Dec. 21, 2011, which is hereby incorporated by reference in its entirety.

FIELD OF THE INVENTION

This application relates to analyzing device similarity.

BACKGROUND

Uses for the Internet and the World Wide Web are continually increasing, and have expanded into "secure" areas. Different mechanisms for maintaining security in a network such as the Internet have been developed, such as the Secure Sockets Layer (SSL) security protocol. The SSL protocol uses a public key infrastructure to maintain security. In establishing an SSL connection between a client computer and a server computer hosting a web page, the server computer transmits a certificate to the client computer for verification or validation.

Typically in practice, when a user's Web browser first tries to contact a server for a secure transaction, the server sends its digital certificate to the browser. This certificate includes (among other things) the server's public key, the server's identity, the name of the certificate authority (CA) that signed the certificate and the signature itself (which is a mathematical hash of the certificate encrypted with the CA's private key). To validate the certificate, the browser computes the certificate hash and compares the result with the hash obtained by decrypting the signature using the CA's public key (as well as checking the validity dates and identity included in the certificate against the desired server). To then validate the server, the browser encrypts a message with the public key obtained from the certificate and sends it to the server. If the server can prove it can decrypt that message then it must have the associated private key and the authentication has succeeded. If desired, the server may likewise validate the browser. Once the browser and (optionally) the server is/are satisfied that each is the computer it claims to be, the browser and server can exchange session keys (additional keys that are used to encrypt the data transfers between the computers from then on).

In web-based systems, such as electronic commerce systems, when data is requested by a client from a server, it is often the case that the web server must query a database to locate the requested data.

In such a case, communications between a server and a web browser client typically require authorization of the client, to permit a client access only to certain data stored by the server. Such data may include, for example, contract information or pricing information which is exclusive to that client; other clients of the web server are not entitled to view this information.

One approach to identifying the client to the server is to initially authenticate the client and to then provide a session identifier to the client in the form of a hypertext transfer protocol (HTTP) cookie. A cookie, which is a form of persistent state object, is a small piece of data generated by the server and which is intended to be passed by the client with every subsequent client request to any server in a defined domain. Upon receipt of the request, the server can verify the client's entitlement to the requested information by comparing the contents of the cookie to the client records stored on the server. Such an approach is disclosed, for example, in U.S. Pat. No. 5,875,296 to Shi et al. (Feb. 23, 1999) in which a cookie including a client identifier is used to access an in-memory credential database used to allow or disallow access to files on a distributed file system. Browser uniqueness is also the subject of "How unique is your web browser" by Electronic Frontier Foundation at http://panopticlick.eff.org/browser-uniqueness.pdf.

Data and cookies that are transmitted between servers and clients on the Internet are subject to certain security risks unless measures are taken to secure communications between the client and server. An unauthorized user at a routing point or at another server in a cookie's domain may capture the packets transmitted between the client and the server and read the data contained in the transmitted cookie. Alternatively, a user may edit the contents of his or her own authorized cookie and alter the session data contained therein to construct a fraudulent session. For example, if the session data includes a contract identification number, the user could edit the cookie to insert a different number and thereby gain access to unauthorized data or resources when the edited cookie is transmitted to the server in a subsequent request. An unauthorized user may furthermore "steal" a valid cookie from an authorized user, and use the cookie to replay a valid session, thereby gaining unauthorized access to the server (a "replay attack").

Further, as the size and diversity of the Internet grows, so do the devices and applications that use the network. Originally, network applications such as web browsers, terminal clients, and e-mail readers were the only programs accessing the Internet. Now, almost every new device or application has a networking component, whether it is to obtain content, updates, manage licensing, or report usage statistics.

Naïve Bayes statistical model is a probabilistic classifier based on applying Bayes' theorem with independence assumption on input features.

Expectation Maximization algorithm is an iterative method for finding maximum likelihood estimates of parameters in statistical model

SUMMARY

A method is used in analyzing device similarity. Data describing a device is received and a model is applied to the data. Based on the modeling, a measure of similarity between the device and a previously known device is determined.

BRIEF DESCRIPTION OF THE DRAWING

The above and further advantages of the present invention may be better understood by referring to the following description taken into conjunction with the accompanying drawings in which identical numbers for elements appearing in different drawing figures represent identical or similar elements throughout the figures:

FIGS. 2-3 are examples of embodiments of organizations of data that may be used in connection with the techniques described herein; and FIG. 4 is an example training step containing device elements used in connection with the techniques described herein.

DETAILED DESCRIPTION

Figure 1:
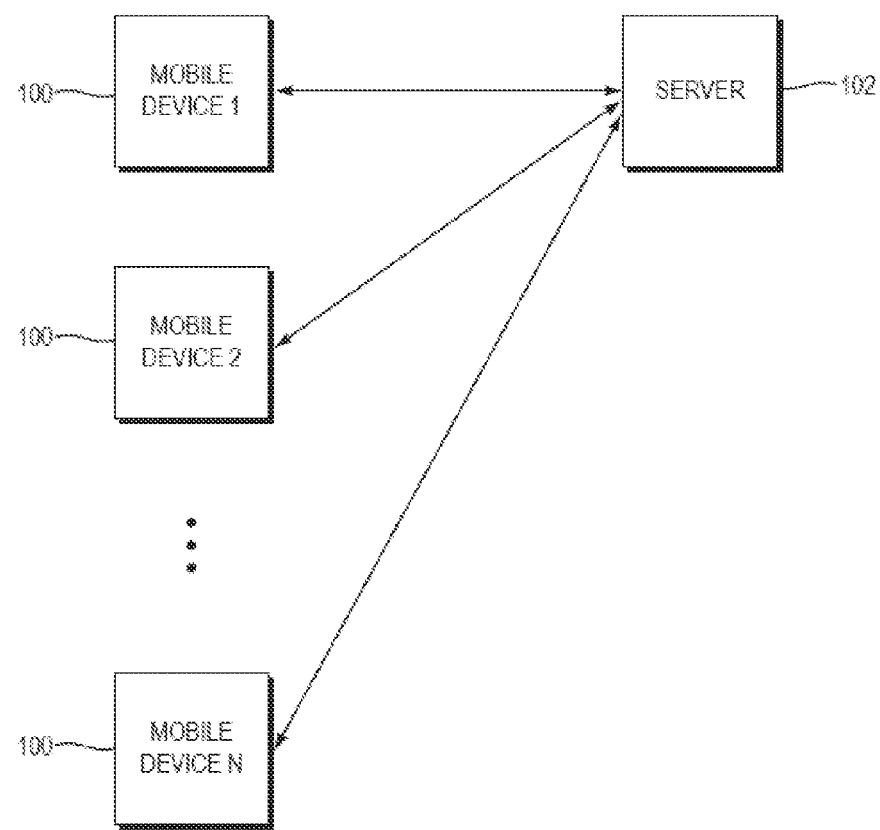
FIG. 1 is an example of an embodiment of a system that may be used in connection with the techniques described herein.

Described below is a technique for use in analyzing device similarity, which technique may be used to help provide, among other things, a device similarity measure or score for device identification.

Conventionally, it is common to use a rule-based method that requires extensive tuning with inflexible performance. For example, conventionally when presented with two set of device components, a rule declares some deterministic conditions that components must satisfy before saying the devices are deterministically the same. The conditions in the conventional system are manually designed and tweaked by hand. The deterministic binary result in the conventional system does not allow control for a tradeoff between false positive and false negative rates.

Referring to FIG. 1, shown is an example of an embodiment of a computer system that may be used in connection with performing the techniques described herein. Data System 10 has Mobile Devices 1, 2, . . . , N 100, and Server 102. Data from Mobile Device 100 may be stored on Server 102, and data stored on Server 102 may be retrieved by Mobile Device 100.

Mobile devices may include any of a variety of devices, such as cell phones, smart phones (e.g., Android phone, Blackberry, iPhone, etc.), laptops, netbooks, tablets, tablet PCs, iPADs, and personal digital assistants (PDAs), among others.

Mobile Devices 100 may be access Server 102 through a variety of means. Such connections are well known in the art, and may include 3G, 4G, General Packet Radio Service (GPRS), and WiFi, among others. It is anticipated that Mobile Devices 100 may utilize newer access technologies as they are developed to access Server 102.

Though FIG. 1 illustrates a single Server 102, multiple servers may be utilized. Further, Data System 10 may be a cloud computing system, and Server 102 may be part of a cloud computer system. Cloud computing is well understood in the art, and generally includes provisioning dynamically scalable and often virtualized resources as a service over the internet. Thus, in a cloud computing system, Server 102 may be a virtual server and actually reside over multiple physical servers. Similarly, in a cloud computing system, there may be multiple Server 102s, and the multiple Server 102s may be virtual servers residing in a single physical server, or in multiple physical servers.

With respect to device matching similarity scoring and background and motivation, identifying whether a user is accessing from a previously detected device ("past seen device") in the user's history has important web-based applications, especially for e-commerce. For example, it can be important to determine whether a device that is now attempting to access data of Server 102 is the same as past seen Mobile Device 1 or past seen Mobile Device 2.

Conventionally, a cookie or flash cookie remains the primary identifier to track a user's devices. However, rising privacy concerns and new regulations are slowly weakening the effectiveness of the use of cookies. By contrast, in at least some implementations using the technique described herein, a new method is provided to track a user's device via components of the user's device signature, without (in at least some cases) embedding or tagging the device with any stored information. According to the method, a data-driven modeling framework is constructed to detect probabilistically whether the unknown device is one of the past seen devices.

When a user's device is connected to a web application, information about a number of device data components is available to the system. This information includes browser-level information such as IP address, user agent string, and accept language setting, and application requested information run by javaScript such as screen size, software fingerprints, and time zone, as shown in FIG. 2. A conventional proposed system or method attempts to make a decision about whether the device was seen before based on a collection of deterministic rules using these elements. Such conventional rule-based methods check a matching status to determine whether selected components match and employ some hard parameters for decision making. For example, a conventional rule may specify that if the "user agent string" matches, a weight of 0.8 is assigned to this fact; if "accept language" matches, a weight of 0.2 is assigned to this fact, if "time zone" does not match, zero weight is assigned to this fact; and then all weights are summed to make up a final score. A threshold is then applied to this score for decision in the conventional method. Conventional static rules such as these generally suffer from problems inherent in rule-based decision systems, including the need for human parameter tuning and inflexibility in controlling false positive and false negative rate as a result of hard decisions.

In contrast to conventional methods such as rule-based methods that require human tuning, at least some implementations based on the technique use a data-driven method that outputs a soft similarity score between first and second devices based on their observed device elements. The first device is the current unknown device, and the second device is a past known user's device. If the similarity score is high, the current unknown device is classified as the same as the earlier known device; otherwise, the unknown device is classified as a new device. In at least some cases, this score is used as a threshold to flexibly control the tradeoff between false positive and false negative rate. Depending on the implementation, in real time, the score is produced by a mathematical model that calculates a similarity "distance" between the current unknown device and the known devices. The model may be trained offline from actual web data automatically without human intervention.

In at least one implementation based on the technique, a critical aspect is how the mathematical model is trained and taught, specifically with respect to the use of principal component analysis in a framework that simultaneously deal with issues of:

Missing data elements. Data elements may not be available due to a user issue (e.g., the user disables javaScript in the browser) or site implementation issues (e.g., the client does not send certain device elements across the board). Static rules assuming availability of a full data set will not work well.

Adapting to element importance. A device element that is popular has a lower value or importance in device matching. For example, if a large majority of devices in a population have a system language setting of "us-en" (US English), the fact that the language setting is a match tells little about whether the device is the same or a different device. A scheme to account for element importance based on its frequency in population is desired.

Adapting to dynamics of changing element value frequency or importance. The popularity of a device element value can change over time. For example, a newly released browser version may increase in popularity over time. A procedure to self-learn changing element frequency is desired.

Accommodating to new device element additions. New device elements may be added over time and in the future. A new device element will have a new pattern in usage. It is desirable to have an automated way to account for and take advantage of richer device elements efficiently.

Lack of truth labels. Device matching is a classification problem: same device or different device. A classification problem typically requires truth labels in training data so that a model can explicitly learn patterns associated with a desired classification outcome. This is commonly called a supervised learning method. However, there are no such labels in the data here; for example, no one can tell the analysis whether a pair of devices are the same or not with absolute certainty. Accordingly, it is desirable to have a learning method that learns in an unsupervised way.

With respect to modeling technology, the device similarity problem may be cast to a statistical modeling problem that automatically learns from data. Techniques described herein enable methods of statistical learning that learns in an unsupervised way by utilizing an Expectation-Maximization (EM) framework in order to output a device similarity score. Within the EM framework, data is prepared and a learning algorithm is constructed. These items and other considerations are described as follows.

With respect to data preparation, a large body of historical login records with device information from many users may be available. The system first collects unlabeled pairs of devices from users wherein in each pair is observed a vector of observed matching status for each element. FIG. 3 illustrates an example vector of observed statuses for a device with nine elements. (With reference to FIG. 2, in cases in which there are more types of device elements that a server can collect, e.g., keyboard layout, CPU type, clock speed, one or more of these types of device elements may be used as well or instead as part of a device element makeup in this general framework. In such cases, the vector as shown in FIG. 3 may be extended to cover these additional elements).

If the data vectors had labels to indicate whether they are from same or different devices, a machine learning model could easily be constructed. For example, a logistic regression model or support vector machine could be constructed to learn from the data and to predict similarity of two unknown devices.

Techniques described herein may be used to implement a machine learning method using a Naïve Bayesian model.

If data vector labels were available, a simple Bayesian learner could be computed for each data element. For example, calculating the probability of same device when we observe user agent string has a match status may be determined by the equation:

$$P(\text{same device}|\text{element user agent string is a match})$$

However, each this results in a simple learner that will be weak in its predictive power. By assuming learners are independent from one another, in the Naïve Bayesian framework, we can then combine their predictions to a single output score as a device similarity score.

The Naive Bayesian model is a simple probabilistic classifier based on the application of Bayes' theorem with strong independence assumptions. A naive Bayes classifier assumes that the presence (or absence) of a particular feature of a class is unrelated to the presence (or absence) of any other feature, given the class variable. In other words, the outcome of a hypothesis or event can be predicted based on some evidences that can be observed.

FIG. 4 illustrates an example training set that may be used with the Naïve Bayesian model. Shown is a table containing device elements including user, language, time zone, and device predicted match. A device may be considered the same as a previously know device if its user, language, and time zone device elements match. A device may also be the same if its user and language are a match. Similarly, a device may be different if its user, language, and time zone are not matches.

However, since labels for data vectors are not available, an Expectation-Maximization method may be used to iteratively and jointly train the Naïve Bayesian model and estimate labels at the same time. The Expectation-Maximization algorithm is an iterative method for finding maximum likelihood estimates of elements a model, where the model depends on unobserved latent variables.

An example embodiment may be implemented as follows. Starting with random labels, use the labels to construct Naïve Bayesian model from the training data vectors as described above. Then apply this model on the data itself to make predictions so every vector has a new label. Use these new labels again to construct a new Naïve Bayesian model which again will be used to make predictions for next iteration. The process may continue iterating as necessary.

With respect to other considerations, given a pair of devices, it is necessary in at least some implementations to decide the match status for each element. One simple alternative is to use a simple string comparison such as strcmp( ) in C language library. However, special attention needs to be paid to the user agent string such that a later user string in time is treated the same as an earlier user agent string if the later one is:

exactly the same as the earlier one, almost same as the earlier one except that one or more of its sub-components has a higher version number (e.g., user upgraded), or almost same as the earlier one except for the existence of new sub-components.

As shown by this example, a simple string match may not be adequate or preferable; other deep user agent string analysis variants may be necessary and/or possible.

With respect to example applications using the technique described herein, many e-commerce applications can benefit from the use of device matching similarity scoring as described herein. For example, in an on-line banking security application, a decision to challenge or deny access to a user may be based on whether the current device matches a previously known device with a similarity score within a threshold. In a case in which a device is defined with non-cookie elements, an incidence of possible cookie theft can be flagged if a current device does not have a high similarity score to a previously known device with the same cookie.

In web session management, instead of cookies, device identification based on scoring may be used to store data about a user's navigation patterns, including across multiple visits. In advertising applications, tracking devices based on scoring may enable merchants to store data about visitors' browsing habits that allow them to build user profiles, which advertisers may use to target users with display advertisements.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. It may be implemented such that herein, when the program code is received and loaded into and executed by a machine, such as a computer, the machine becomes an apparatus for practicing the invention. When implemented on one or more general-purpose processors, the program code combines with such a processor to provide a unique apparatus that operates analogously to specific logic circuits.

Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. A method for use in analyzing device similarity, the method comprising:
    receiving data describing a set of mobile devices, wherein the set of mobile devices includes an unknown mobile device and a previously known mobile device, wherein the data includes a plurality of components associated with the set of mobile devices, wherein the components include device hardware element data and application data, wherein each component of the plurality of components is measured by weight of popularity and frequency, and wherein the weight of each component of the plurality of components changes dynamically based on changing of the popularity and the frequency of use of the plurality of components;
    constructing, using the data, a first data vector for each of the plurality of components for the unknown mobile device and a second data vector for each of the plurality of components for the previously known mobile device, wherein a comparison between the first data vector and the second data vector represent components that are selected from the group consisting of matching components, mismatching components, and missing components, and wherein the first and second data vectors are unlabeled;
    applying a probabilistic classifier model to the first and second unlabeled data vectors, wherein an expectation-maximization method iteratively and jointly trains the probabilistic classifier model and estimates labels for each of the first and second unlabeled data vectors at the same time, wherein the expectation-maximization method calculates a similarity score for each of the unknown mobile device and the previously known mobile device; and
    based on the similarity scores, determining a measure of similarity between the unknown mobile device and the previously known mobile device by comparing the similarity scores against a threshold.

2. The method of claim 1, wherein the model is a Naïve Bayesian model.

3. The method of claim 2, wherein an expectation-maximization method is used to train the Naïve Bayesian model.

4. The method of claim 2, wherein the Naïve Bayesian model is applied to random labels to generate new labels.

5. The method of claim 4, wherein the Naïve-Bayesian model is applied iteratively to the new labels to generate a next iteration of new labels.

6. The method of claim 1, wherein the measure of similarity is expressed as a probability that the device is the previously known device.

7. The method of claim 1, wherein the device is tracked via components of a device signature of the device.

8. The method of claim 1, wherein the measure of similarity accounts for importance of an element based on a frequency of the element in a population.

9. The method of claim 1, wherein the measure of similarity accommodates new device element additions.

10. The method of claim 1, wherein the measure of similarity is based on an unsupervised learning method.

11. A system for use in analyzing device similarity, the system comprising:
    first logic configured to receive data describing a set of mobile devices, wherein the set of mobile devices includes an unknown mobile device and a previously known mobile device, wherein the data includes a plurality of components associated with the set of mobile devices, wherein the components include device hardware element data and application data, wherein each component of the plurality of components is measured by weight of popularity and frequency, and wherein the weight of each component of the plurality of components changes dynamically based on changing of the popularity and the frequency of use of the plurality of components;
    second logic configured to construct, using the data, a first data vector for each of the plurality of components for the unknown mobile device and a second data vector for each of the plurality of components for the previously known mobile device, wherein a comparison between the first data vector and the second data vector represent components that are selected from the group consisting of matching components, mismatching components, and missing components, and wherein the first and second data vectors are unlabeled;
    third logic configured to apply a probabilistic classifier model to the first and second unlabeled data vectors, wherein an expectation-maximization method iteratively and jointly trains the probabilistic classifier model and estimates labels for each of the first and second unlabeled data vectors at the same time, wherein the expectation-maximization method calculates a similarity score for each of the unknown mobile device and the previously known mobile device; and
    forth logic configured to, based on the similarity scores, determine a measure of similarity between the unknown mobile device and the previously known mobile device by comparing the similarity scores against a threshold.

12. The system of claim 11, wherein the model is a Naïve Bayesian model.

13. The system of claim 12, wherein an expectation-maximization method is used to train the Naïve Bayesian model.

14. The system of claim 12, wherein the Naïve Bayesian model is applied to random labels to generate new labels.

15. The system of claim 14, wherein the Naïve-Bayesian model is applied iteratively to the new labels to generate a next iteration of new labels.

16. The system of claim 11, wherein the measure of similarity is expressed as a probability that the device is the previously known device.

17. The system of claim 11, wherein the device is tracked via components of a device signature of the device.

18. The system of claim 11, wherein the measure of similarity accounts for importance of an element based on a frequency of the element in a population.

19. The system of claim 11, wherein the measure of similarity accommodates new device element additions.

20. The system of claim 11, wherein the measure of similarity is based on an unsupervised learning method.

* * * * *